UNITED STATES PATENT OFFICE.

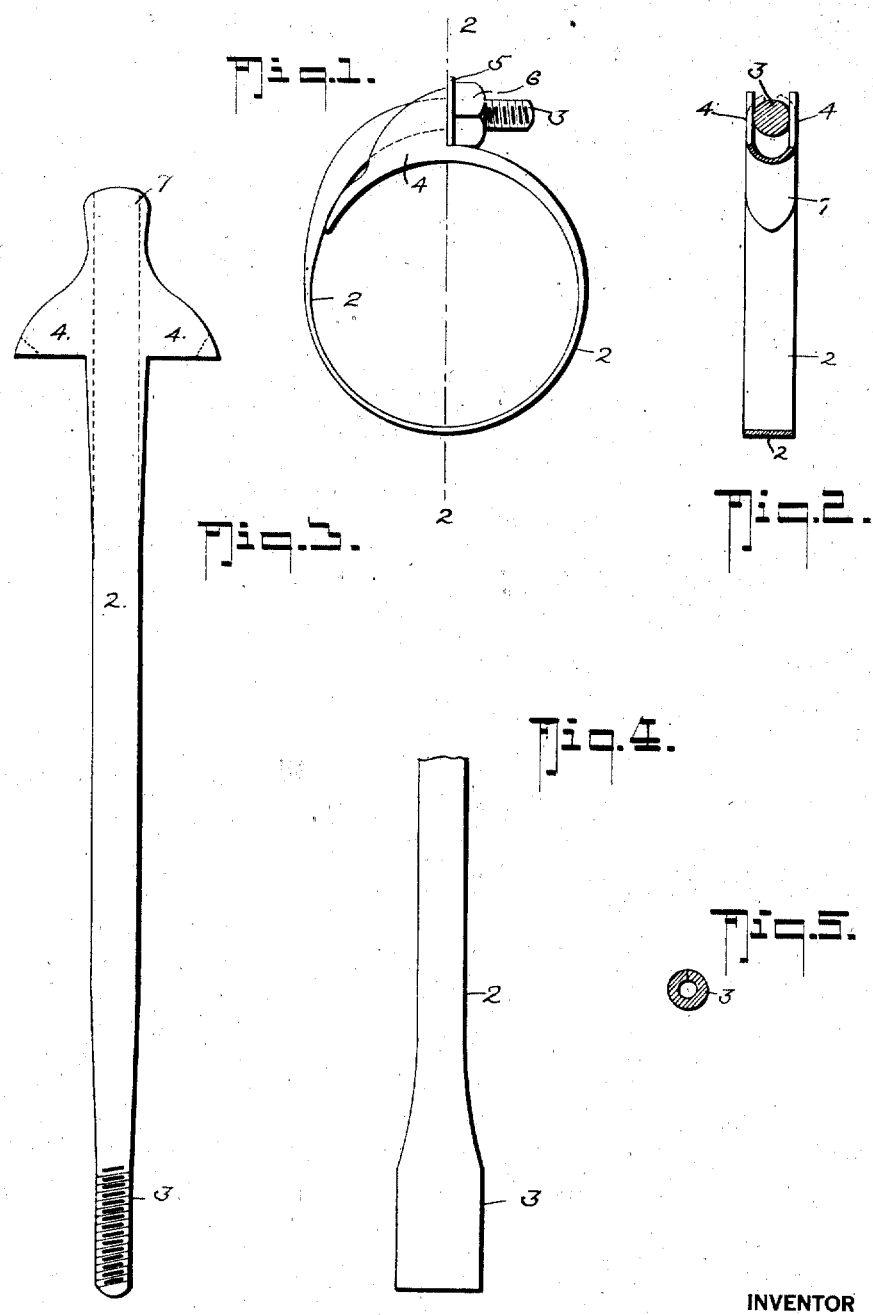

ARTHUR D. WESTCOTT, OF PORTEAU, BRITISH COLUMBIA, CANADA.

HOSE-PIPE CLASP.

1,252,637.  Specification of Letters Patent.  Patented Jan. 8, 1918.

Application filed September 17, 1917. Serial No. 191,822.

*To all whom it may concern:*

Be it known that I, ARTHUR D. WESTCOTT, a citizen of the Dominion of Canada, residing at Porteau, in the Province of British Columbia, Canada, have invented certain new and useful Improvements in Hose-Pipe Clasps, of which the following is a specification.

This invention relates to a hose-pipe clasp such as is used to secure a hose-pipe on the metal pipe or nipple to which it is connected. The improvements are directed to the provision of a flexible band in one piece that will exercise its grip all around the circumference of the hose-pipe, and that will have a considerable range between its maximum and minimum limits adapting it to variation in the diameter of the hose-pipe to which it is applied.

These results are attained by forming the body of the band of thin sheet metal with one end shaped and threaded as a bolt to receive the tightening nut and its washer, and the other end shaped and outwardly turned to form a seat for the nut and washer.

Those portions of the band which are adjacent the bolt end and the nut seat respectively have a measure of rigidity imparted to them that enables them to transmit the tension imposed by the bolt and nut to the side of the clasp opposite the connection.

The invention is particularly described in the following specification, reference being made to the drawings by which it is accompanied, in which:

Figure 1 is a side elevation of the clasp in the plane of the circumference.

Fig. 2 is a section on the line 2—2 in Fig. 1.

Fig. 3 is a development of the band before flanging and bending.

Figs. 4 and 5 show the development and cross section of a modification in one end of the band.

In these drawings 2 represents the body of the clasp which is of thin flat metal and preferably stamped from the sheet. One end 3 is formed and threaded as a tightening bolt and adjacent the other end portions 4 are shaped and bent outward from the sides of the band to form a bracket seat for the washer 5 and nut 6 of the bolt end 3 and leave an end 7 to project under the bolt end and support the bracket seat.

Between the side portions 4 and immediately adjacent them the thin metal of the clasp is rounded in cross section where it contacts with the band as shown in Figs. 1 and 2, which rounding not only enables the bolt end 3 to come closer to the periphery of the hose-pipe but imparts a measure of rigidity to the clasp in that sector of it adjacent the tightening connection of the two ends, and thereby enables the tightening action to be applied to the side of the hose-pipe opposite the tightening connection.

The end 3 may be solid, forged with the band 2 or welded to it, or the entire band may be stamped from sheet metal and, as shown in Figs. 4 and 5, the edges of the end 3 may be rounded outward and closed on one another to form the round bolt form.

A clasp so constructed is adaptable to considerable variation in the diameter of the hose-pipe as when a greater or less ply of canvas is used in its manufacture, as there is no stop to limit the overlap of the end 3 past the shoulder of the nut seat 4, so that the limit of contraction is the amount of thread provided on the end 3. The relatively rigid form of each end 3 of the clasp prevents the ends adjacent the connection from being bent inward on the hose-pipe as is common with many of the clasps at present on the market and it also enables the tightening tension to be transmitted more equably around the clasp.

The clasp is convenient to use, as, being thoroughly flexible and open on the outer side of the nut seat, it may be passed around the hose-pipe after the same is in place on the pipe to which it is connected.

Having now particularly described my invention, I hereby declare that what I claim as new and desire to be protected in by Letters Patent, is:

1. A hose-pipe clasp, comprising a band stamped from thin sheet metal and bent to encircle the hose-pipe, one end of said band being rounded and threaded to receive a nut by which the clasp may be tightened on the hose-pipe, and adjacent the other end of the band its side edges are shaped and turned outward to form a bracketed seat for the nut, the edges of the band adjacent each end being in cross section rounded outward to impart a measure of rigidity to the clasp adjacent the connection of the ends.

2. A hose-pipe clasp, comprising a strip of thin sheet metal, the edges of which adjacent one end are so shaped that they may be outwardly turned and rounded to receive a thread and nut and adjacent the other end the edges have lateral projections offering a square shoulder to the threaded end of the strip, said lateral projection being turned outward to form together a shouldered seat for the tightening nut threaded on the other end.

In testimony whereof I affix my signature.

ARTHUR D. WESTCOTT.